US008259667B2

(12) United States Patent
Jung et al.

(10) Patent No.: US 8,259,667 B2
(45) Date of Patent: Sep. 4, 2012

(54) METHOD AND APPARATUS FOR PROVIDING SERVICE IN A COMMUNICATION SYSTEM

(75) Inventors: Young-Ho Jung, Suwon-si (KR); Cheol-Woo You, Seoul (KR); Yung-Soo Kim, Seongnam-si (KR); Sung-Hyun Cho, Suwon-si (KR); Jong-Hyung Kwun, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 914 days.

(21) Appl. No.: 11/946,456

(22) Filed: Nov. 28, 2007

(65) Prior Publication Data
US 2008/0130570 A1    Jun. 5, 2008

(30) Foreign Application Priority Data
Nov. 28, 2006  (KR) .................. 10-2006-0118500

(51) Int. Cl.
    *H04Q 7/00* (2006.01)
(52) U.S. Cl. ........................................ 370/330; 370/329
(58) Field of Classification Search .................. 370/229, 370/230, 310, 328, 329, 330; 455/450, 509
    See application file for complete search history.

(56) References Cited

U.S. PATENT DOCUMENTS

| 5,583,869 | A  | * | 12/1996 | Grube et al. ................... 370/347 |
| 5,603,085 | A  | * | 2/1997  | Shedlo ........................... 455/450 |
| 6,134,226 | A  | * | 10/2000 | Reed et al. ...................... 370/328 |
| 6,138,010 | A  | * | 10/2000 | Rabe et al. .................. 455/426.1 |
| 6,891,810 | B2 | * | 5/2005  | Struhsaker et al. ............ 370/294 |
| 7,164,912 | B2 | * | 1/2007  | Buckley et al. ............ 455/435.2 |
| 7,453,801 | B2 | * | 11/2008 | Taneja et al. .................. 370/230 |
| 7,668,253 | B2 |   | 2/2010  | Hwang et al. |
| 7,697,948 | B2 | * | 4/2010  | Wan et al. ...................... 455/509 |
| 2003/0125031 | A1 |   | 7/2003 | Lim et al. |
| 2005/0068934 | A1 | * | 3/2005 | Sakoda ......................... 370/350 |
| 2005/0136898 | A1 | * | 6/2005 | Shaheen et al. ............ 455/414.1 |
| 2005/0143018 | A1 | * | 6/2005 | Shinozaki ....................... 455/76 |
| 2005/0143086 | A1 |   | 6/2005 | Schwarz |
| 2006/0128392 | A1 | * | 6/2006 | Turina et al. ................ 455/452.1 |
| 2006/0217147 | A1 | * | 9/2006 | Olvera-Hernandez et al. .......................... 455/552.1 |
| 2007/0268860 | A1 | * | 11/2007 | Taneja ........................... 370/329 |
| 2008/0039133 | A1 | * | 2/2008 | Ma et al. ..................... 455/552.1 |
| 2008/0101307 | A1 | * | 5/2008 | Sindhushayana et al. ..... 370/337 |
| 2008/0108367 | A1 | * | 5/2008 | Afrashteh et al. .......... 455/452.2 |
| 2008/0112356 | A1 | * | 5/2008 | Jung et al. ...................... 370/328 |
| 2008/0132291 | A1 | * | 6/2008 | Barr et al. ...................... 455/567 |
| 2009/0239530 | A1 | * | 9/2009 | Luo et al. .................... 455/432.1 |

FOREIGN PATENT DOCUMENTS

| EP | 1 677 563 | 7/2006 |
| KR | 1020020023912 | 3/2002 |
| KR | 1020050089699 | 9/2005 |

* cited by examiner

*Primary Examiner* — Chi Pham
*Assistant Examiner* — Robert Lopata
(74) *Attorney, Agent, or Firm* — The Farrell Law Firm, P.C.

(57) ABSTRACT

A method for providing a service in a communication system is provided. A Base Station (BS) supporting a plurality of communication service modes allocates communication resources for each of the plurality of communication service modes according to a ratio determined in accordance with a communication service mode preferred by a terminal. The BS transmits a combination of resources allocated for each of the plurality of communication service modes to the terminal. The communication service mode preferred by the terminal is determined using at least one of channel condition of the terminal, moving velocity, preferred communication mode, required performance, billing system, and user preference.

22 Claims, 8 Drawing Sheets

| Service mode | sampling rate (MHz) | number of samples for CP | CP time (usec) | FFT size | subcarrier spacing (kHz) | OFDM symbol time (usec) | number of OFDM symbols per sub frame | sub frame time (msec) |
|---|---|---|---|---|---|---|---|---|
| New Mobile 1 | 23.0 | 41 | 1.78 | 1024 | 19.53 | 46.304 | 216 | 10.00 |
| New Mobile 2 | 23.0 | 122 | 5.30 | 2048 | 9.77 | 94.348 | 106 | 10.00 |
| New Nomadic 1 | 23.0 | 43 | 1.87 | 2048 | 9.77 | 90.913 | 110 | 10.00 |
| New Nomadic 2 | 23.0 | 82 | 3.57 | 2048 | 9.77 | 92.609 | 108 | 10.00 |
| Relay Link | 23.0 | 122 | 5.30 | 2048 | 9.77 | 94.348 | 106 | 10.00 |
| Ad-Hoc | 23.0 | 43 | 1.87 | 2048 | 9.77 | 90.913 | 110 | 10.00 |
| Broadcasting | 23.0 | 229 | 9.96 | 2048 | 9.77 | 99.000 | 101 | 10.00 |

FIG.4

METHOD AND APPARATUS FOR PROVIDING SERVICE IN A COMMUNICATION SYSTEM

PRIORITY

This application claims priority under 35 U.S.C. §119(a) to a Korean Patent Application filed in the Korean Intellectual Property Office on Nov. 28, 2006 and assigned Serial No. 2006-118500, the disclosure of which is incorporated herein by reference.

BACKGROUND OF THE INVENTION

1. Field of the Invention

The present invention relates to a method and apparatus for providing the best service to a user in a communication system supporting multiple communication service modes.

2. Description of the Related Art

A single radio communication system provides only one communication service mode specialized for its own situation, and includes a Base Station (BS) that supports the corresponding communication service mode using a single Radio Access Technology (RAT). In the single radio communication system, users are able to receive more than two services in the same area. These services may include Wireless Local Area Network (WLAN), $2^{nd}$ generation Code Division Multiple Access (CDMA), Wireless Broadband Internet (WiBro), Wideband CDMA (W-CDMA), etc. For selection of the services receivable in the same area, each user selects the service determined to be favorable according to the situation, rather than automatically making a connection to the best service.

When the user receives more than two services, the different service providers independently manage spectrums, services, terminals and BSs for the different services. Therefore, even though there is a particular unused frequency band, the corresponding frequency is not borrowed by other communication services, causing a decrease in service efficiency.

The user may purchase separate terminals supporting corresponding services, or may have a multi-mode terminal supporting both of the two services. However, this makes seamless service switching impossible, and causes the user to separately subscribe to his/her desired services, increasing the total service charge.

SUMMARY OF THE INVENTION

The present invention has been made to address at least the above problems and/or disadvantages and to provide at least the advantages described below. Accordingly, an aspect of the present invention provides a method and apparatus for providing the best service to a user in a communication system supporting multiple communication service modes.

Another aspect of the present invention provides a method and apparatus for generating superframes formed by properly allocating multiple communication service modes supported by a Base Station (BS) to frequency/time/space resources according to various environmental conditions, and transmitting the superframes to a corresponding terminal.

According to one aspect of the present invention, a method for providing a service in a communication system is provided. Communication resources for each of the communication service modes are allocated by a Base Station (BS) supporting multiple communication service modes according to a ratio determined in accordance with a communication service mode preferred by a terminal. A combination of communication resources allocated for each communication service mode is transmitted to the terminal.

According to another aspect of the present invention, a method for receiving a service by a terminal in a communication system supporting multiple communication service modes is provided. A first transmission unit is received including reference signals capable of estimating expected performance for each of the communication service modes, and information indicating which time/frequency resources each of the communication service modes uses to service the corresponding communication service mode. A best communication service mode is determined using the reference signals. Receipt of a second transmission unit to which the best communication service mode is mapped is determined, and a request message for allocation of the second transmission unit to which the best communication service mode is mapped is transmitted, upon failure to receive the second transmission unit.

According to a further aspect of the present invention, an apparatus for providing a service in a communication system is provided. The apparatus includes a Base Station (BS) supporting multiple communication service modes, for allocating communication resources for each of the communication service modes according to a ratio determined in accordance with a communication service mode preferred by a terminal, and transmitting a combination of resources allocated for each communication service mode to the terminal.

According to yet another aspect of the present invention, an apparatus is provided for receiving a service in a communication system supporting multiple communication service modes. The apparatus includes a terminal for receiving a first transmission unit including reference signals capable of estimating expected performance for each of the communication service modes, and information indicating which time/frequency resources each of the communication service modes uses to service the corresponding communication service mode. The terminal also determines a best communication service mode using the reference signals. The terminal further determines receipt of a second transmission unit to which the best communication service mode is mapped, and transmits a request message for allocation of the second transmission unit to which the best communication service mode is mapped, upon failure to receive the second transmission unit.

BRIEF DESCRIPTION OF THE DRAWINGS

The above and other aspects, features and advantages of the present invention will become more apparent from the following detailed description when taken in conjunction with the accompanying drawings in which:

FIG. 4 illustrates a frame generated to provide a variable RAT according to an embodiment of the present invention;

DETAILED DESCRIPTION OF THE PREFERRED EMBODIMENTS

Figure 1:
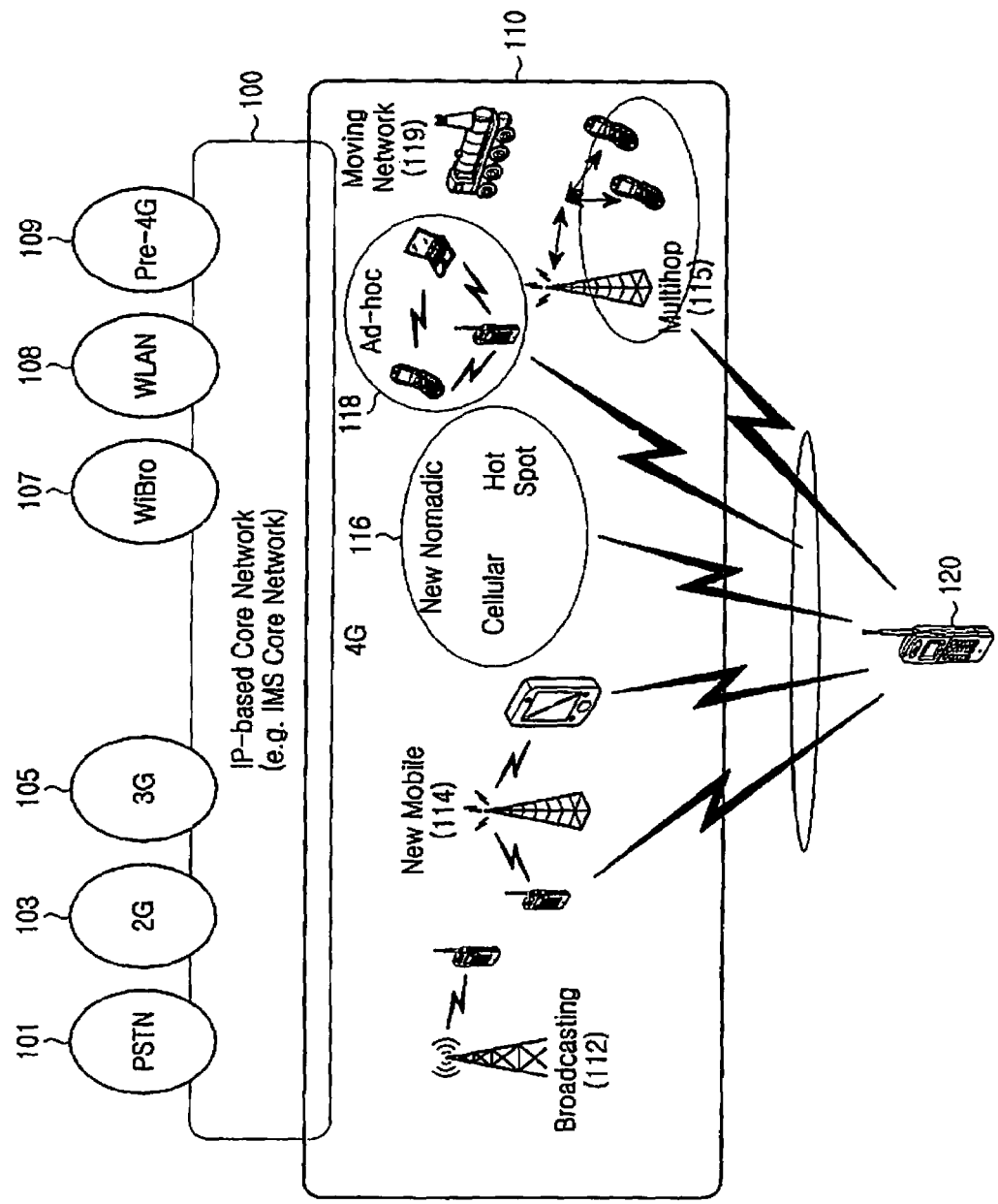
FIG. 1 illustrates a configuration of a communication system supporting multiple communication service modes according to an embodiment of the present invention.

Preferred embodiments of the present invention are described in detail with reference to the accompanying drawings. In the drawings, the same or similar elements are denoted by the same reference numerals even though they are depicted in different drawings. Detailed descriptions of constructions or processes known in the art may be omitted to avoid obscuring the subject matter of the present invention.

FIG. 1 illustrates a configuration of a communication system supporting multiple communication service modes according to an embodiment of the present invention.

Referring to FIG. 1, a core network 100 in the communication system supports multiple Internet Protocol (IP)-based communication service modes. The communication service modes include communication systems for providing a single communication service mode, such as Public Switched Telephone Network (PSTN) 101, $2^{nd}$ Generation (2G) 103, $3^{rd}$ Generation (3G) 105, Wireless Broadband Internet (WiBro) 107, Wireless Local Area Network (WLAN) 108, Pre-$4^{th}$ Generation (Pre-4G) 109, etc.

A user terminal (or Mobile Station (MS)) 120 can effectively receive multiple communication service modes by means of various means supporting a 4G service system 110. The 4G service system 110 includes a Broadcasting mode 112, a New Mobile mode 114, a New Nomadic mode 116 (or hot spot communication mode in the low-speed moving environment), a Multi-hop mode 115, an Ad-hoc mode 118, and a Moving Network mode 119.

It is assumed herein that the single radio communication system has multiple Radio Access Technologies (RATs) specialized for multiple communication service modes, for providing the communication service modes optimized for users, in the environment where various communication service modes are supported as shown in FIG. 1. Each Base Station (BS) can service more than two communication service modes, and combinations of communication service modes and their corresponding BSs can be all different.

Figure 2:
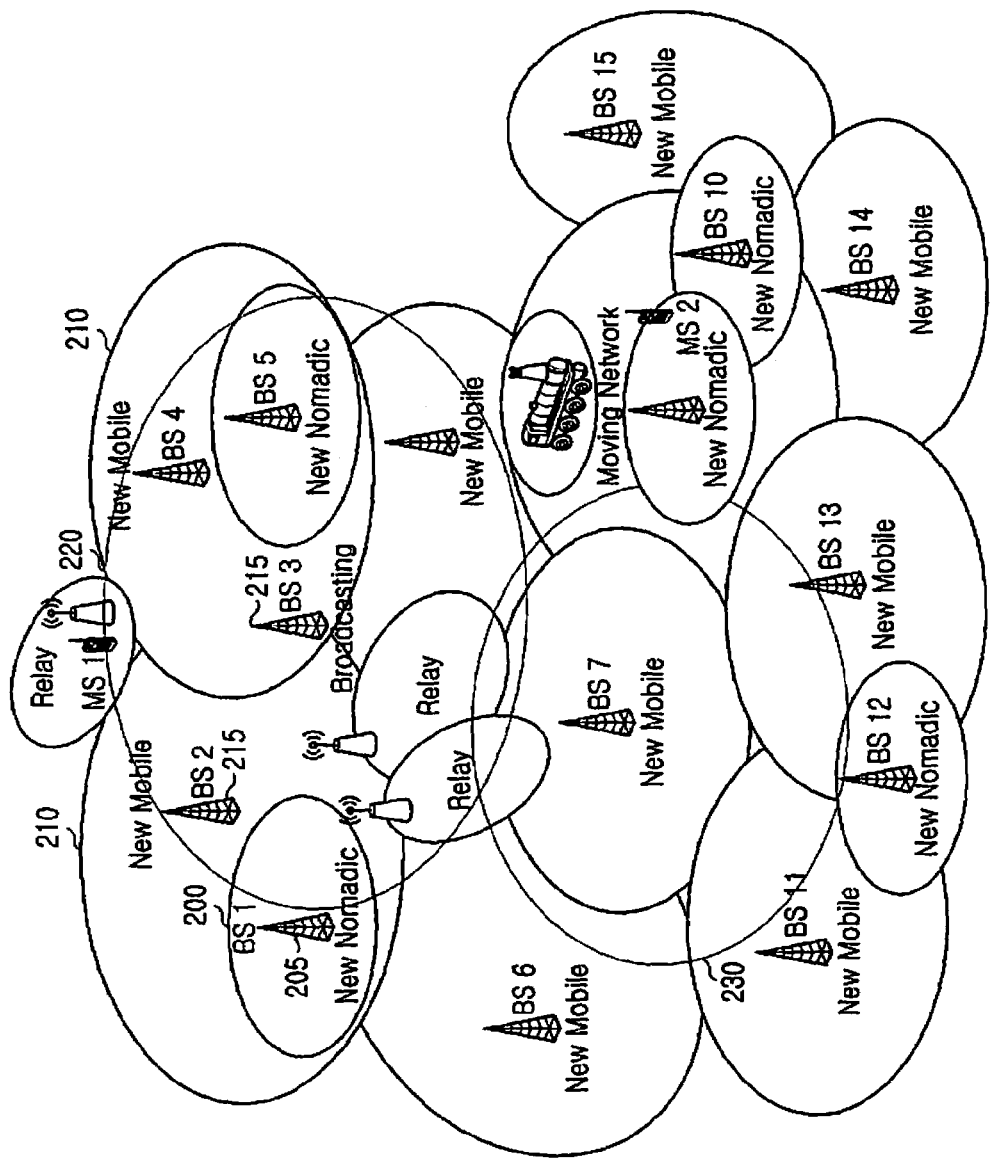
FIG. 2 illustrates a cell arrangement concept of a mobile communication system according to an embodiment of the present invention.

FIG. 2 illustrates a cell arrangement concept of a mobile communication system according to an embodiment of the present invention.

Referring to FIG. 2, BSs 1-15 provide multiple communication service modes, and have different service coverages for the communication service modes.

For example, the communication service modes provided by BS 1 205 include the New Nomadic mode and the New Mobile mode. Cell coverage area 200 where BS 1 205 provides the New Nomadic mode is different in size from cell coverage area 210 where BS 1 205 provides the New Mobile mode. The communication service modes provided by BS 2 215 include the New Mobile mode and the Broadcasting mode. Cell coverage area 210 where BS 2 215 provides the New Mobile mode is also different in size from cell coverage area 220 where BS 2 215 provides the Broadcasting mode. That is, the cell coverage areas for the communication service modes provided by the same BS can be different in size, and in this case, the transmission signals for the communication service modes can also be different in power. Therefore, each BS can simultaneously service multiple communication service modes using separate time, frequency and space resources, and RATs. The full frequency band can be used as the frequency resources that can be used in each BS that provides the multiple communication service modes. However, inter-cell interference can be reduced by variably managing the frequency resources according to the condition of an adjacent cell, or by applying a different resource allocation pattern to every BS.

Embodiments of the present invention propose a detailed method for efficiently allocating communication resources given to each BS for the multiple communication service modes and providing the best service to support the best communication service mode to each terminal in the environment where multiple communication service modes are provided. In brief, the embodiments of the present invention provides a method for allocating communication resources to the multiple communication service modes supported by a BS, a method for generating a communication frame, and a method for disposing BSs.

Figure 3:
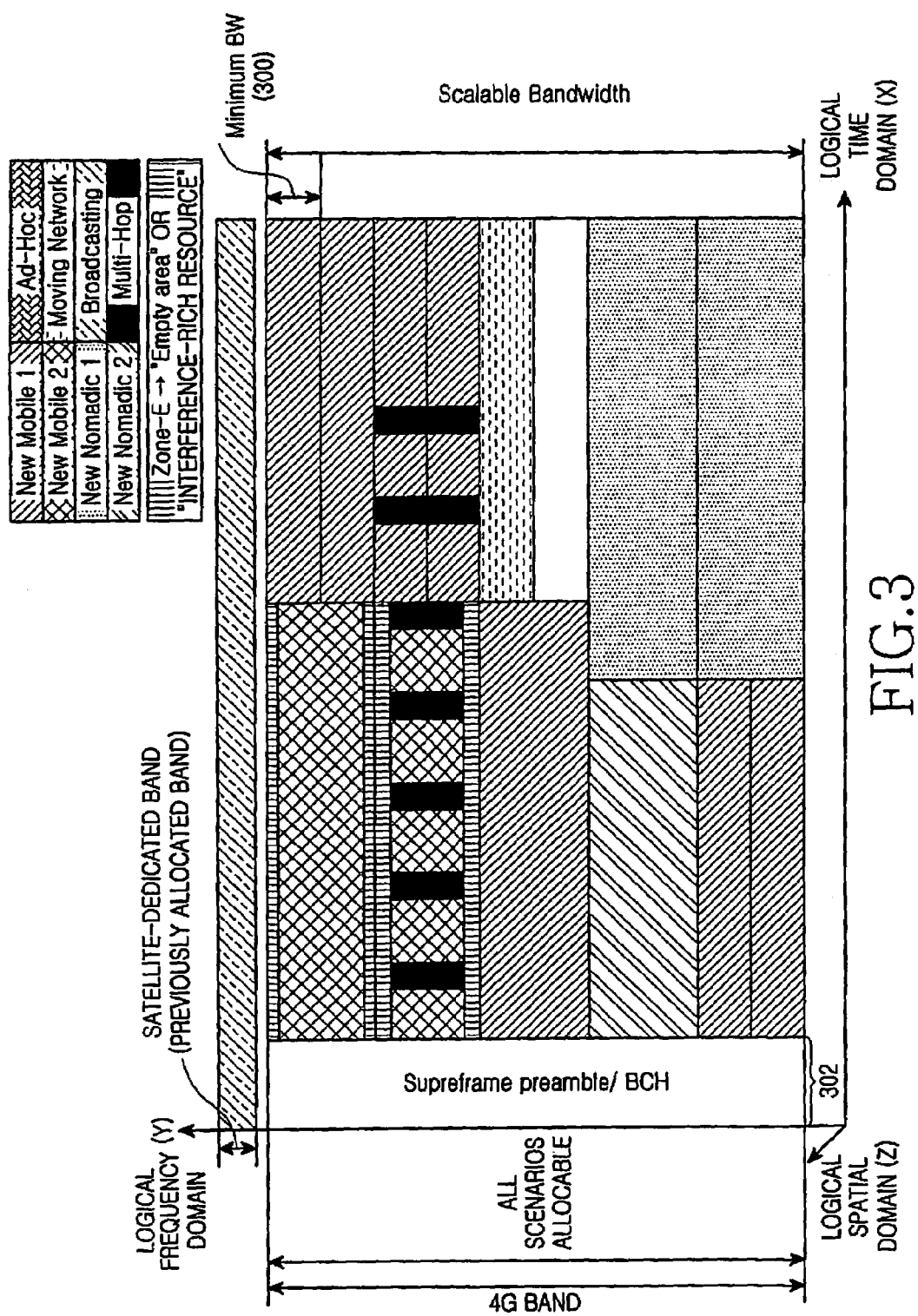
FIG. 3 illustrates a frequency allocation method by a BS according to an embodiment of the present invention.

FIG. 3 illustrates a frequency allocation method by a BS according to an embodiment of the present invention. The X-axis indicates the entire allocable time domain, the Y-axis indicates the entire allocable frequency domain, and the Z-axis indicates the two-dimensional time-frequency space domain. It is assumed herein that the multiple communication service modes supported by the BS include New Mobile 1, New Mobile 2, New Nomadic 1, New Nomadic 2, Ad-hoc, Moving Network, Broadcasting, and Multi-hop.

Referring to FIG. 3, each BS divides the frequency/time/space communication resources independently, and uses them for RATs of its supportable services.

An arbitrary BS allocates the entire frequency band Y to the multiple communication service modes provided by the BS itself. Information on the RAT for the corresponding communication service mode and a superframe preamble 302 for acquiring synchronization with a broadcast channel are first allocated, and then the remaining frequency/time bands are allocated to the multiple communication service modes provided by the BS. Here, frequency bands having various sizes greater than or equal to the minimum Bandwidth (BW) 300 are allocated for the communication service modes.

The frequency band Y is subdivided in the time X. Because each of the multiple communication service modes supported by the corresponding BS should be allocated within predetermined time resource, subframes having the same unit time can be generated. An arrangement pattern of the subframes varies according to the user distribution per corresponding service mode, or the traffic situation.

The resource allocation pattern of FIG. 3 shows an example for a particular BS. For other BSs, patterns different from that of FIG. 3 can be generated according to the user distribution per service mode, or the traffic situation, using the Z-axis.

Even for the BS of FIG. 3, patterns different from that of FIG. 3 can be generated according to the type and ratio of the communication service mode preferred by a user in the cell based on the time variation.

Each BS supporting multiple communication service modes can service the communication service modes using different RATs, through the resource allocation stated above. The BS can periodically change the RAT serviced in each position of the resources, and information on the changed RAT is transmitted to the user terminal using a superframe preamble and a broadcast channel. That is, means capable of estimating information on the pattern in which the RAT is provided to the terminal and the expected performance of each RAT is transmitted over the superframe preamble and the broadcast channel at stated intervals. Thereafter, upon receipt of a reference signal by which it is possible to estimate the RAT information and expected performance, the corresponding terminal can select the communication technology optimized therefor depending on the RAT information in the communication system supporting multiple communication service modes.

Although the conventional BS, when it supports one communication service mode, transmits no information thereon, the proposed BS, when it supports at least one communication service mode, transmits information on its supportable communication service mode to the corresponding terminal over the superframe preamble and the broadcast channel.

As shown in FIG. 3, if the basic unit of resources allocable to the communication service mode on a changed basis is fixed, and there is considerable interference affecting other communication resources of an adjacent BS or the corresponding BS as a particular communication service mode is allocated to the corresponding resource, it is possible to reduce the interference by defining appropriate guard time/frequency (or empty area) within the basic resource allocation unit.

FIG. 4 illustrates a frame generated to provide a variable RAT according to an embodiment of the present invention.

Referring to FIG. 4, the supportable communication service modes include New Mobile 1, New Mobile 2, New Nomadic 1, New Nomadic 2, Relay Link, Ad-hoc, and Broadcasting.

A sampling rate in MHz, the number of samples for a Cyclic Prefix (CP), the CP time in microseconds (μsec), an Fast Fourier Transform (FFT) size, the subcarrier spacing in kilohertz (KHz), the Orthogonal Frequency Division Multiplexing (OFDM) symbol time in μsec, the number of OFDM symbols per subframe, and the subframe time in milliseconds (msec) are previously set to be suitable for the best communication environment for each of the communication service modes. Here, the subframe time is fixed to 10 msec regardless of the communication service modes.

Figure 5:
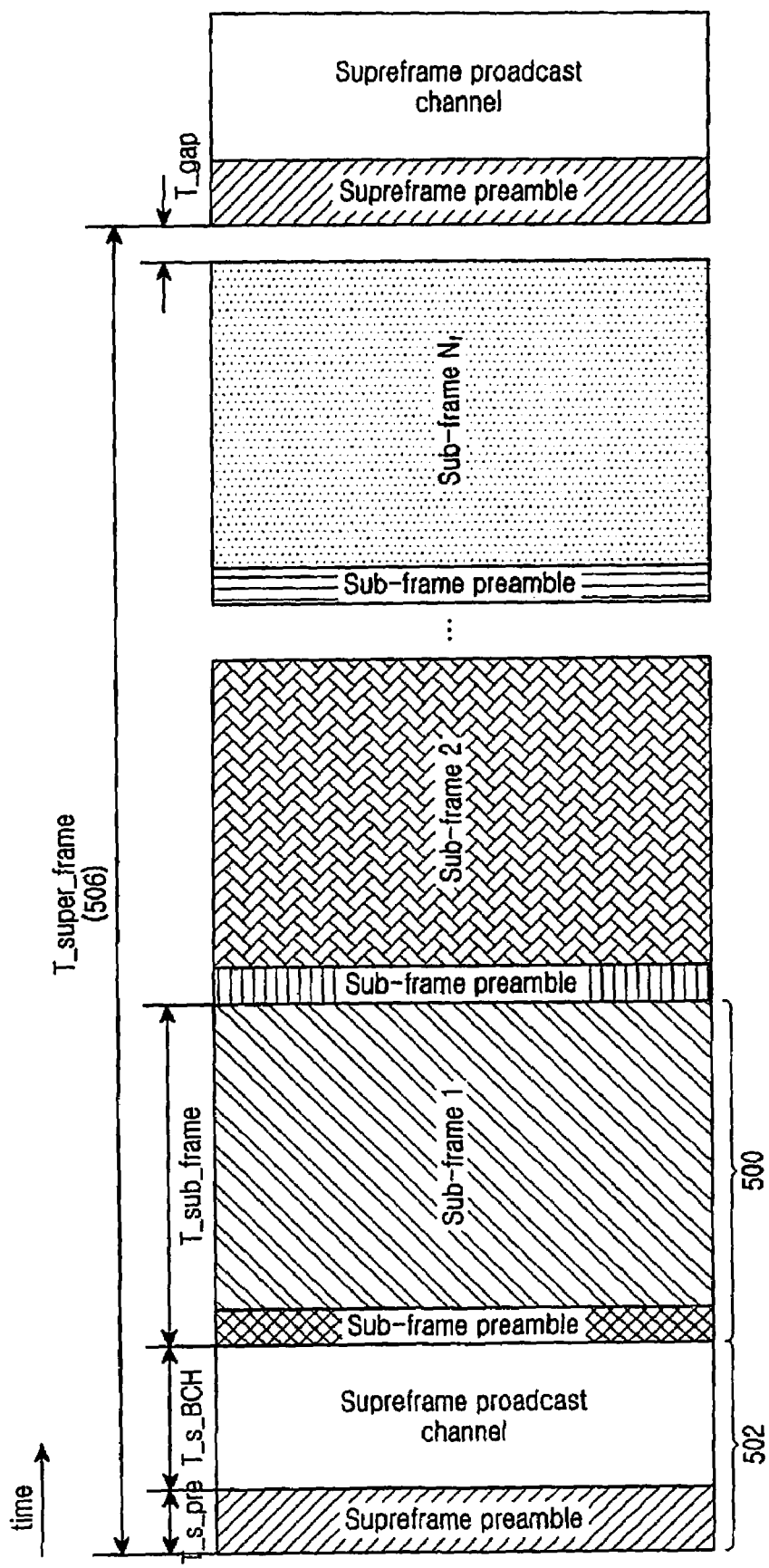
FIG. 5 illustrates a structure of a superframe according to an embodiment of the present invention.

FIG. 5 illustrates a structure of a superframe according to an embodiment of the present invention.

Referring to FIG. 5, RAT information and a superframe preamble 502 for acquiring synchronization with a broadcast channel are first allocated, and then a subframe 500 is allocated at intervals of a predetermined time T_sub_frame. The subframes each are composed of a preamble and the remaining part except for the preamble, and each subframe is mapped to a different RAT, i.e. one of the multiple communication service modes supported by the BS.

The BS generates a superframe 506 depending on a ratio of communication service modes for each user among its supportable communication service modes in such a manner that one superframe 506 is composed of multiple subframes. For example, superframe 506 is composed of $N_f$ subframes $1$-$N_f$, and the superframe preamble and the broadcast channel can be transmitted in units of the superframe. Here, subframes corresponding to only some of the communication service modes supportable by the corresponding BS can exist in a particular superframe. Information on the types of all communication service modes supportable by the BS and configuration information of the subframes allocated to the corresponding superframe are transmitted in the superframe preamble and the broadcast channel.

After a lapse of a predetermined time T_gap, the next superframe is transmitted to the corresponding terminal.

Figure 6:
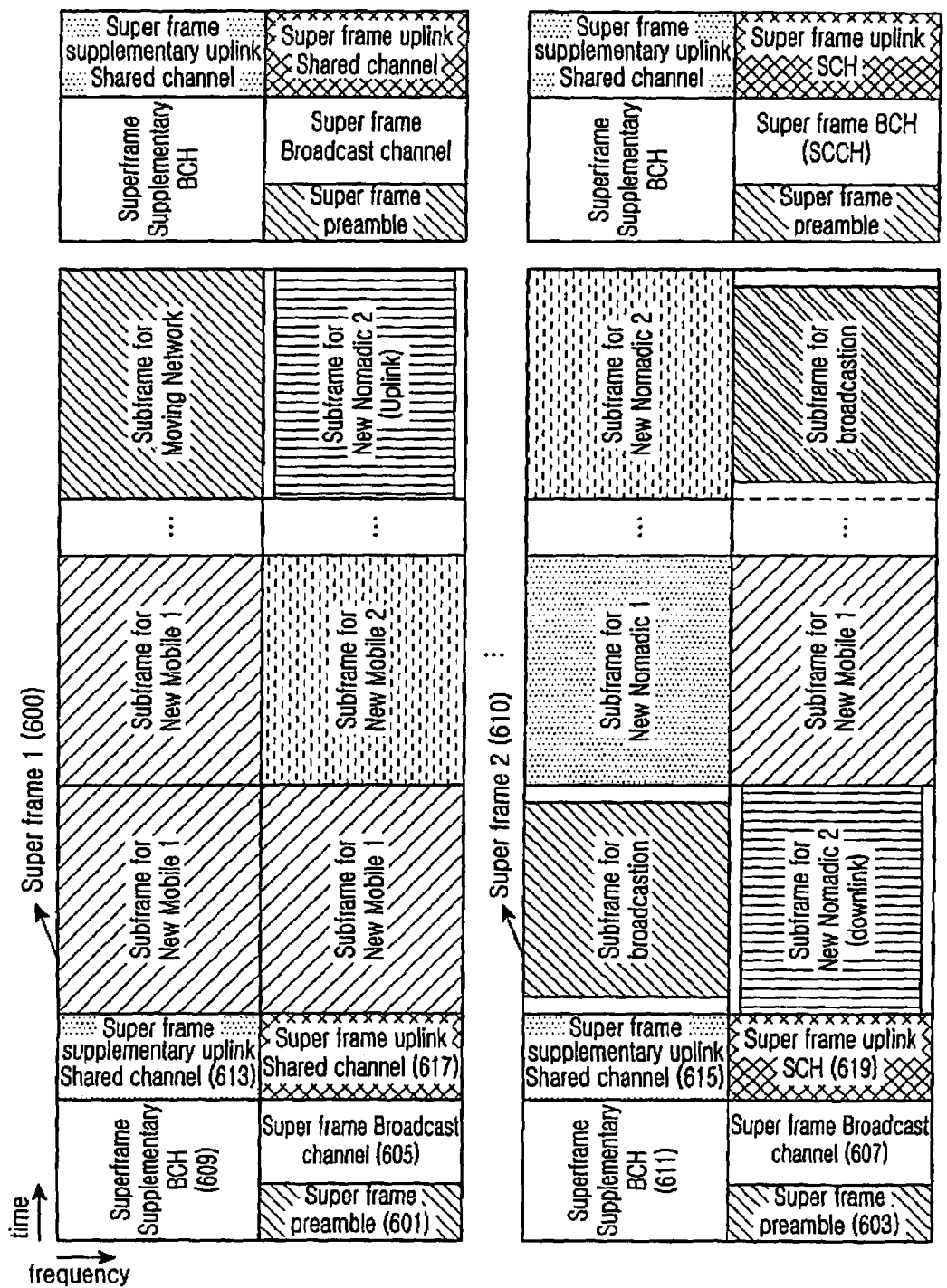
FIG. 6 illustrates resource allocation positions of a BS and superframe configuration combinations according to an embodiment of the present invention.

FIG. 6 illustrates resource allocation positions of a BS and superframe configuration combinations according to an embodiment of the present invention.

Referring to FIG. 6, a superframe 1 600 and a superframe 2 610 are different in terms of the communication service mode allocated to each subframe in the two-dimensional time-frequency domain.

For example, in superframe 1 600, New Mobile 1 is mapped to a first subframe and a second subframe, and Moving Network is mapped to the last subframe. However, in superframe 2 610, Broadcasting is mapped to a first subframe, New Nomadic 1 is mapped to a second subframe, and New Nomadic 2 is mapped to the last subframe. That is, the superframe, composed of subframes to which the multiple communication service modes supportable by one BS are mapped, can be configured in various combinations other than that of FIG. 6.

The BS transmits information on the combination of the configured subframes over superframe preambles 601 and 603, and superframe broadcast channels 605 and 607. The frequency subbands over which superframe preambles 601 and 603, superframe broadcast channels 605 and 607, and superframe uplink shared channels 613 and 615 are transmitted can be limited to a part of the entire band. Here, the BS can transmit additional information for communication of the terminal capable of receiving the frequency band of subbands over which superframe preambles 601 and 603, and broadcast channels 605 and 607 are not transmitted, over super frame supplementary broadcast channels 609 and 611, and superframe supplementary uplink shared channels 617 and 619.

The BS transmits a reference signal, capable of estimating superframe configuration information and expected performance of each communication service mode, to the corresponding terminal over the superframe preamble and the broadcast channel. Thereafter, upon receipt of the frame, configured according to the allocated resources over the preamble and broadcast channel, the corresponding terminal can select the best BS and RAT in its own environment, and can determine which RAT the corresponding BS can service, and which time/frequency resources the BS will use to service the RAT.

Figure 7:
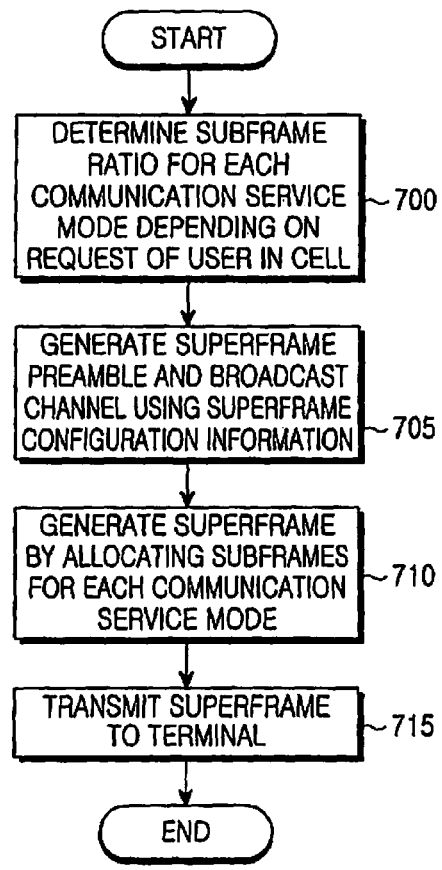
FIG. 7 illustrates operation of a BS according to an embodiment of the present invention.

FIG. 7 illustrates operation of a BS according to an embodiment of the present invention.

Referring to FIG. 7, in step 700, a BS determines a ratio of subframes for each communication service mode within a superframe depending on the amount of communication resources required by a user in the cell.

In step 705, the BS generates a superframe preamble and a broadcast channel of the superframe including a reference signal capable of estimating expected performance for each corresponding communication service mode.

In step 710, the BS allocates subframes for each communication service mode according to the determined ratio, and configures the superframe using the allocated subframes. In step 715, the BS transmits the superframe to the corresponding terminal.

Figure 8:
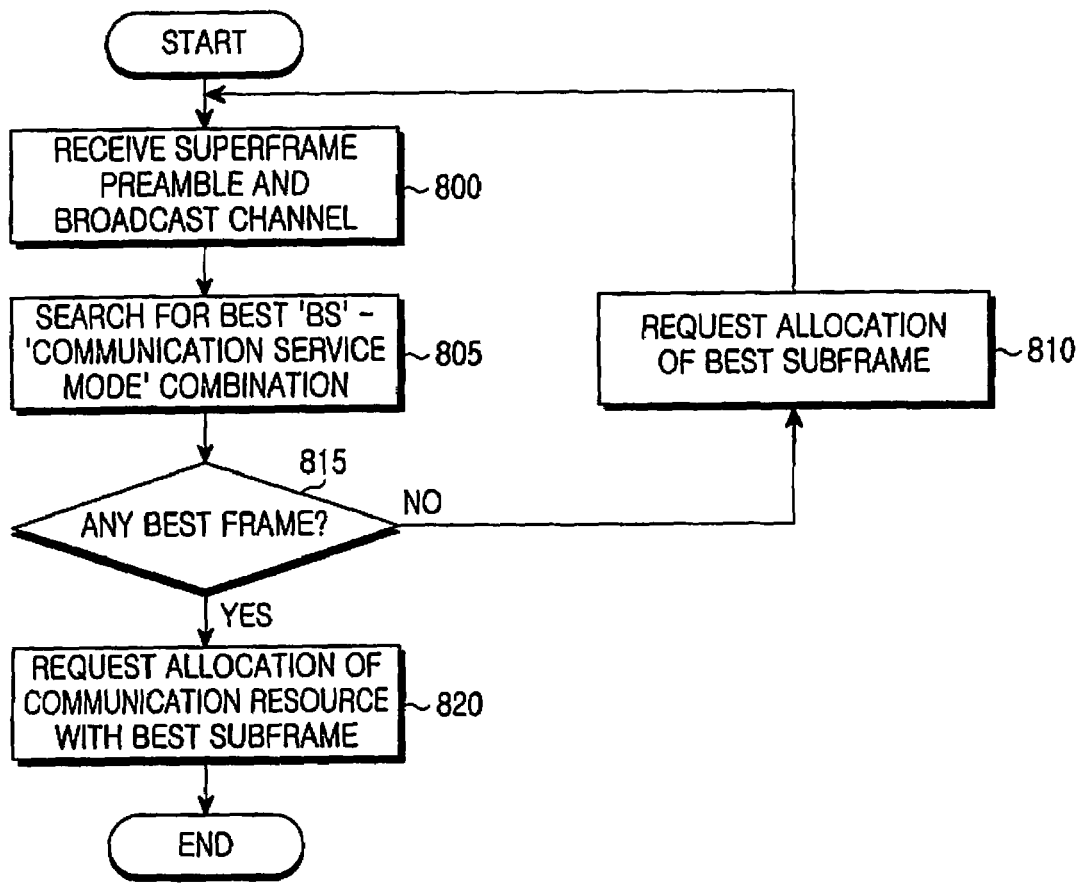
FIG. 8 illustrates operation of a terminal according to an embodiment of the present invention.

FIG. 8 illustrates operation of a terminal according to an embodiment of the present invention.

Referring to FIG. 8, a terminal receives a superframe preamble and a broadcast channel from an adjacent BS in step 800, and searches for the best combination among the combinations of the BS and the communication service mode in step 805. The terminal determines in step 815 whether the subframe associated with the corresponding best communication service mode is provided in the current superframe of the BS. If it is determined that the subframe is provided in the current superframe, the terminal requests allocation of communication resources with the corresponding subframe in step 820 after which the methodology terminates. However, if it is determined that the subframe is not provided in the current superframe, the terminal requests allocation of a subframe associated with the corresponding best communication service mode in step 810 and the methodology returns to step 800.

As described above, for the multiple communication service modes provided by an arbitrary BS, different services can be provided to terminals located in the same position according to the channel environment and traffic situation of the corresponding terminals, making it possible to provide the best service to the corresponding terminals.

As is apparent from the foregoing description, the embodiments of the present invention provide the best service to the corresponding user in terms of rate, price, delay, and bit error rate, thereby contributing to an increase in communication satisfaction and a reduction in resource waste.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing a service in a communication system, the method comprising the steps of:
   allocating communication resources for each of a plurality of communication service modes corresponding to wireless access technologies by a Base Station (BS) supporting the plurality of communication service modes, according to a ratio of the plurality of communication service modes determined in accordance with a communication service mode preferred by a terminal; and
   transmitting a combination of communication resources allocated for each of the plurality of communication service modes to the terminal,
   wherein allocating communication resources comprises:
   allocating the communication resources corresponding to a first transmission unit that is periodically transmitted regardless of a service mode supported by a corresponding terminal;
   dividing remaining communication resources except for communication resources corresponding to the first transmission unit into second transmission units; and
   mapping the second transmission units corresponding to the ratio determined in accordance with the communication service mode preferred by the terminal for each of the plurality of communication service modes.

2. The method of claim 1, wherein the communication service mode preferred by the terminal is determined using at least one of channel condition of the terminal, moving velocity, preferred communication mode, required performance, billing system, and user preference.

3. The method of claim 1, wherein the first transmission unit and the second transmission unit each are a partial unit of communication resources comprising a frequency band and a time domain.

4. The method of claim 1, wherein the first transmission unit includes a reference signal capable of estimating expected performance for each of the plurality of communication service modes to allow the terminal to determine a best communication service mode, and information indicating which time/frequency resources each of the plurality of communication service modes of the BS uses to service the corresponding communication service mode.

5. The method of claim 1, wherein the ratio determined in accordance with the communication service mode preferred by the terminal varies according to user distribution per corresponding service mode, or traffic situation.

6. A method for receiving a service by a terminal in a communication system supporting a plurality of communication service modes, the method comprising:
   receiving a first transmission unit including reference signals capable of estimating expected performance for each of the plurality of communication service modes, and information indicating which time/frequency resources each of the plurality of communication service modes uses to service the corresponding communication service mode;
   determining a best communication service mode using the reference signals; and
   determining receipt of a second transmission unit to which the best communication service mode is mapped, and transmitting a request message for allocation of the second transmission unit to which the best communication service mode is mapped, upon failure to receive the second transmission unit.

7. The method of claim 6, further comprising:
   upon receipt of the second transmission unit to which the best communication service mode is mapped, requesting resource allocation for the best communication service mode using the received second transmission unit.

8. The method of claim 6, wherein the first transmission unit and the second transmission unit each are a partial unit of communication resources comprising a frequency band and a time domain.

9. The method of claim 8, wherein the first transmission unit is allocated such that it is periodically transmitted regardless of a service mode supported by the terminal, and includes a reference signal capable of estimating expected performance for each of the plurality of communication service modes to allow the terminal to determine a best communication service mode, and information indicating which time/frequency resources each of the plurality of communication service modes of the BS uses to service the corresponding communication service mode.

10. The method of claim 8, wherein the second transmission unit is obtained by dividing remaining communication resources except for communication resources corresponding to the first transmission unit at regular intervals, and is mapped to each of the plurality of communication service modes according to a ratio determined considering a communication service mode preferred by the terminal, wherein the ratio determined in accordance with the communication service mode preferred by the terminal varies according to user distribution per corresponding service mode, or traffic situation.

11. The method of claim 10, wherein the communication service mode preferred by the terminal is determined using at least one of channel condition of the terminal, moving velocity, preferred communication mode, required performance, billing system, and user preference.

12. An apparatus for providing a service in a communication system, the apparatus comprising:
   a Base Station (BS) supporting a plurality of communication service modes corresponding to wireless access technologies, for allocating communication resources for each of the plurality of communication service modes, according to a ratio of the plurality of communication service modes determined in accordance with a communication service mode preferred by a terminal, and transmitting a combination of communication resources allocated for each of the plurality of communication service modes to the terminal,
   wherein the BS allocates the communication resources corresponding to a first transmission unit that is periodically transmitted regardless of a service mode supported by a corresponding terminal; divides remaining communication resources except for the communication resources corresponding to the first transmission unit into second transmission units; and maps the second transmission units corresponding to the ratio determined in accordance with the communication service mode preferred by the terminal for each of the plurality of communication service modes.

13. The apparatus of claim 12, wherein the communication service mode preferred by the terminal is determined using at least one of channel condition of the terminal, moving velocity, preferred communication mode, required performance, billing system, and user preference.

14. The apparatus of claim 12, wherein the first transmission unit and the second transmission unit each are a partial unit of communication resources comprising a frequency band and a time domain.

15. The apparatus of claim 12, wherein the first transmission unit includes a reference signal capable of estimating expected performance for each of the plurality of communication service modes to allow the terminal to determine a best communication service mode, and information indicating which time/frequency resources each of the plurality of communication service modes of the BS uses to service the corresponding communication service mode.

16. The apparatus of claim 12, wherein the ratio determined in accordance with the communication service mode preferred by the terminal varies according to user distribution per corresponding service mode, or traffic situation.

17. An apparatus for receiving a service in a communication system supporting a plurality of communication service modes, the apparatus comprising:
a terminal for receiving a first transmission unit including reference signals capable of estimating expected performance for each of the plurality of communication service modes, and information indicating which time/frequency resources each of the plurality of communication service modes uses to service the corresponding communication service mode; determining a best communication service mode using the reference signals; and determining receipt of a second transmission unit to which the best communication service mode is mapped, and transmitting a request message for allocation of the second transmission unit to which the best communication service mode is mapped, upon failure to receive the second transmission unit.

18. The apparatus of claim 17, wherein upon receipt of the second transmission unit to which the best communication service mode is mapped, the terminal requests resource allocation for the best communication service mode using the received second transmission unit.

19. The apparatus of claim 18, wherein the first transmission unit and the second transmission unit each are a partial unit of communication resources comprising a frequency band and a time domain.

20. The apparatus of claim 19, wherein the first transmission unit is allocated such that it is periodically transmitted regardless of a service mode supported by the terminal, and includes a reference signal capable of estimating expected performance for each of the plurality of communication service modes to allow the terminal to determine a best communication service mode, and information indicating which time/frequency resources each of the plurality of communication service modes of the BS uses to service the corresponding communication service mode.

21. The apparatus of claim 19, wherein the second transmission unit is obtained by dividing remaining communication resources except for the communication resources corresponding to the first transmission unit at regular intervals, and is mapped to each of the plurality of communication service modes according to a ratio determined considering a communication service mode preferred by the terminal, wherein the ratio determined in accordance with the communication service mode preferred by the terminal varies according to user distribution per corresponding service mode, or traffic situation.

22. The apparatus of claim 21, wherein the communication service mode preferred by the terminal is determined using at least one of channel condition of the terminal, moving velocity, preferred communication mode, required performance, billing system, and user preference.

\* \* \* \* \*